United States Patent
Baek et al.

(10) Patent No.: US 8,184,165 B2
(45) Date of Patent: May 22, 2012

(54) APPARATUS AND METHOD FOR RUNNING DUAL CAMERAS IN A PORTABLE TERMINAL

(75) Inventors: Il-Seob Baek, Yongin-si (KR); Seung-Jun Lee, Suwon-si (KR); Joong-Ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 771 days.

(21) Appl. No.: 12/274,648

(22) Filed: Nov. 20, 2008

(65) Prior Publication Data

US 2009/0128635 A1    May 21, 2009

(30) Foreign Application Priority Data

Nov. 20, 2007   (KR) .................. 10-2007-0118727

(51) Int. Cl.
*H04N 5/225*    (2006.01)

(52) U.S. Cl. .................. 348/207.99; 348/275
(58) Field of Classification Search ............ 348/207.99, 348/211.11, 159, 373–375
See application file for complete search history.

(56) References Cited

U.S. PATENT DOCUMENTS

5,635,981 A * 6/1997 Ribacoff .................. 348/156
* cited by examiner

*Primary Examiner* — Tuan Ho
(74) *Attorney, Agent, or Firm* — Jefferson IP Law, LLP (57) ABSTRACT

An apparatus and method for separating and connecting a main camera and a sub camera in a portable terminal are provided. The portable terminal includes a main camera for receiving a main clock signal from a main chip and transmitting a main camera pixel clock signal to the main chip in response to the main clock signal, a sub camera for receiving the main clock signal from the main chip and transmitting a sub camera pixel clock signal to the main chip in response to the main clock signal, and a switch for configuring a path from the main chip to at least one of the main camera and the sub camera.

15 Claims, 8 Drawing Sheets

–GENERATING DISTORTED PCLOCK BY THE VIDEO CALL CAMERA–
( VOLTAGE LEVEL : 1.2V )

APPARATUS AND METHOD FOR RUNNING DUAL CAMERAS IN A PORTABLE TERMINAL

PRIORITY

This application claims the benefit under 35 U.S.C. §119 (a) of a Korean patent application filed in the Korean Intellectual Property Office on Nov. 20, 2007 and assigned Serial No. 10-2007-0118727, the entire disclosure of which is hereby incorporated by reference.

BACKGROUND OF THE INVENTION

1. Field of the Invention

The present invention relates to an apparatus and method for running dual cameras in a portable terminal. More particularly, the present invention relates to an apparatus and method for separating a sub camera path from a main camera path using a switch in a portable terminal.

2. Description of the Related Art

The use of portable terminals is rapidly increasing due to developments in various electronics and communications technologies. In addition to their main communication functions, portable terminals have been developed to support a variety of additional functions to meet users' demands. For example, portable terminals provide additional functions such as a phonebook, games, a short message service, an internet service, an e-mail service, a morning call, a file viewer, a file transfer, an auto response service, a camera service and various other functions.

As the number of additional functions combined into the portable terminal is increasing, the more complicated the organization of the portable terminal is becoming. Also, the performance of the portable terminal potentially deteriorates as the electronic components on the main board interfere with each other.

For example, as the camera resolution of the portable terminal advances from Quarter Common Intermediate Format (CIF) to Video Graphics Array, 1.3 Mega-pixels, 2 Mega-pixels and beyond, the clock frequency of the camera increases. Therefore, interference between components increases.

A portable terminal employing dual cameras, such as a main camera and a camera for making video calls, has been recently introduced. In such a portable terminal having dual cameras, there is also a tendency that the portable terminal will have a slim design. Moreover, the cameras have a high number of pixels. In this situation, the module of the camera is likely to be affected by noise and therefore may not work well. Also, as the number of camera pixels increases, the amount of data generated by the camera pixels increases, and therefore a faster main clock and pixel clock are needed. However, the faster clocks influence other circuits within the portable terminal.

In general, when the portable terminal executes, a camera operation, a main chip or a backend chip for display controls the camera. As part of the control, the main chip or the backend chip provides a main clock to a module of the camera. In turn, the module of the camera generates a pixel clock using the main clock.

Accordingly, unless the portable terminal includes a main chip or backend chip for display of a video call, the video call camera uses the same camera data path as the main camera. When the main camera operates, the data path of the video call camera affects the clock of the main camera and leads to improper functioning of the main camera.

Figure 1A:
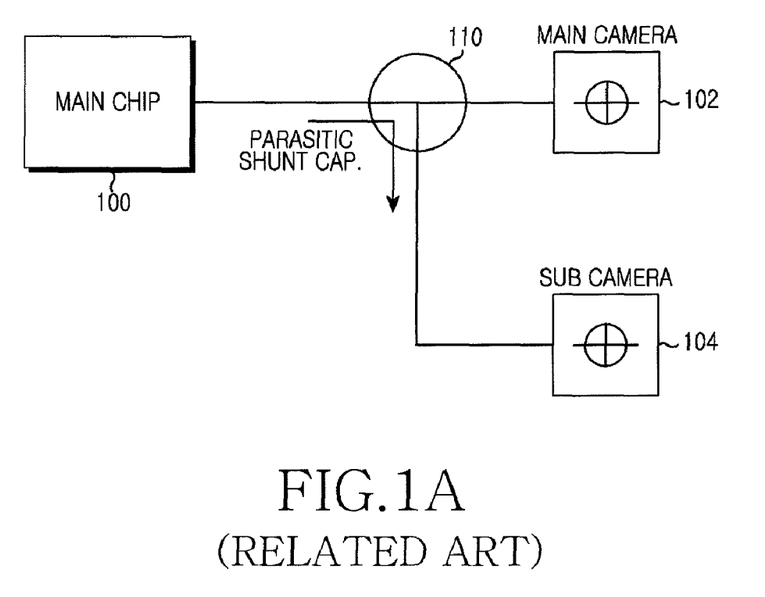
FIGS. 1A and 1B are block diagrams illustrating a construction of inputting a clock signal to dual cameras in a portable terminal according to the conventional technology.
Figure 1B:
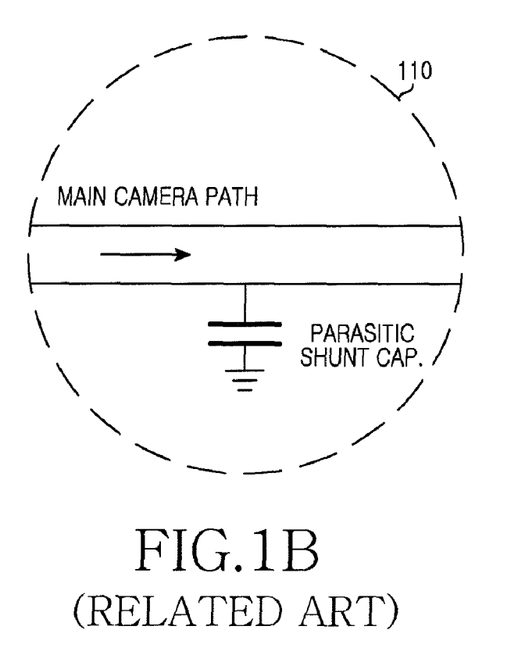

FIGS. 1A and 1B are block diagrams illustrating an input clock signal to dual cameras in a conventional portable terminal. In the description below, a main camera is a general high-pixel camera and a sub camera is a video call camera.

Referring to FIG. 1A, a main chip 100 provides a main clock signal to the sensors of a main camera 102 or a sub camera 104. The main chip 100 receives a pixel clock signal from the main camera 102 or the sub camera 104. In the connection as used in the conventional art, the main camera 102 and the sub camera 104 share a common routing point 110 from the main chip 100.

As described above, if the main camera and the sub camera use the same path from the main chip, that is if they share a common routing point 110, a clock waveform of the main camera is subject to interference by the load of the sub camera. For example, as illustrated in more detail in FIG. 1B, the connection of the sub camera to the common routing point 110 results in a parasitic shunt capacitor ($C_{eq}$) which functions as a load on the main camera as described by Equation (1).

$$T = R * C_{eq}$$

$$Z_{in} = 2\Pi * f * C_{eq} \tag{1}$$

In Equation (1), T denotes a rising time of a clock signal, Zin denotes an input impedance, R denotes a resistance, and f denotes a clock frequency. As is evident from Equation (1), the rise time T changes by the magnitude of the shunt capacitor of the sub camera and Zin increases in proportion to the magnitude of the shunt capacitor of the sub camera and the frequency of clock.

In a conventional arrangement, the sub camera may be positioned on a sub body and the main-camera may be positioned on a main body in a slide type portable terminal. When the sub body slides to the operating position, a length of a clock path of the sub camera between the main chip and the sub camera increases. Accordingly, unless the portable terminal includes a backend chip, the size of the shunt capacitor load would be larger according to the length of the connection path and a problem may occur such as a collapse of the clock waveform or a pixel error. Accordingly, a need exists for an apparatus and method for operating dual cameras in a portable terminal.

SUMMARY OF THE INVENTION

An aspect of the present invention is to address at least the above-mentioned problems and/or disadvantages and to provide at least the advantages described below. Accordingly, one aspect of the present invention is to provide an apparatus and method for operating dual cameras in a portable terminal.

Another aspect of the present invention is to provide an apparatus and method for separating a sub camera path from a main camera path using a switch in a portable terminal.

In accordance with an aspect of the present invention, an apparatus for separating a sub camera signal path and a main camera signal path in a portable terminal is provided. The apparatus includes a main camera for receiving a main clock signal from a main chip and transmitting a main camera pixel clock signal to the main chip in response to the main clock signal, a sub camera for receiving the main clock signal from the main chip and transmitting a sub camera pixel clock signal to the main chip in response to the main clock, and a switch for configuring a path from the main chip to at least one of the main camera and the sub camera.

In accordance with another aspect of the present invention, a method for separating a main camera signal path from a sub camera signal path in a portable terminal is provided. The method includes determining if a main camera is selected, if the main camera is selected, isolating a path from a main chip to a sub camera, if the main camera is not selected, determining if the sub camera is selected, and if the sub camera is selected, establishing a path from the main chip to the sub camera.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention described below relate to an apparatus and method for separating a sub camera path from a main camera path using a switch in a portable terminal. In the following description, the term "main camera" denotes a general high-pixel camera of portable terminal and the term "sub camera" denotes a camera used to make a video call in a portable terminal.

Figure 2:
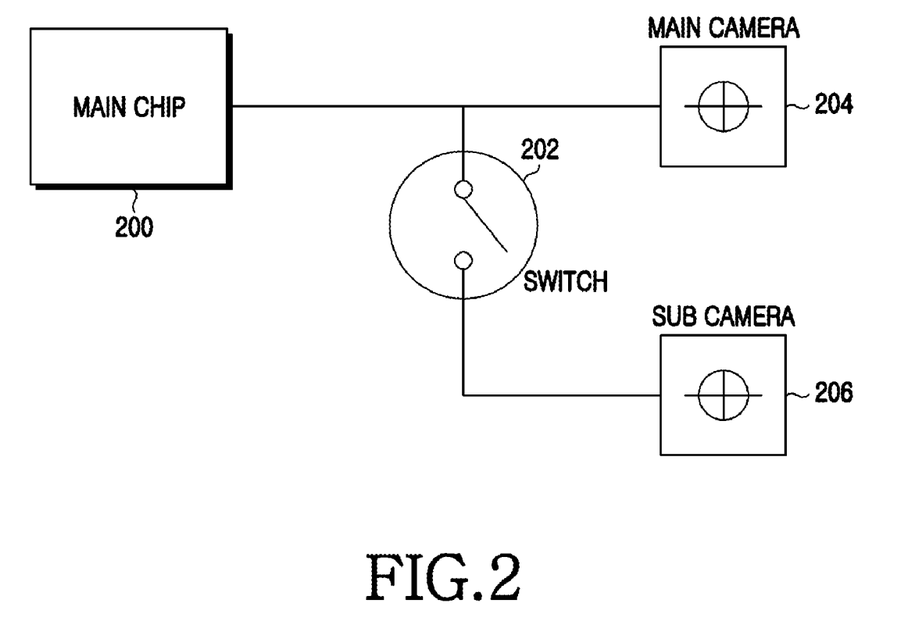
FIG. 2 is a block diagram illustrating a construction for separating a sub camera path from a main camera path in a portable terminal according to an exemplary embodiment of the present invention.

FIG. 2 is a block diagram illustrating a construction for separating a sub camera path from a main camera path in a portable terminal according to an exemplary embodiment of the present invention. Referring to FIG. 2, the portable terminal includes a main chip 200, a switch 202, a main camera 204, and a sub camera 206.

The main chip 200 provides a main clock signal using the sensor of the main camera 204 or the sub camera 206. Also, the main chip 200 receives a pixel clock from the main camera 204 or the sub camera 206 currently being used.

As illustrated in FIG. 2, the main camera 204 is electrically connected directly to the main chip 204. That is, the switch 202 does not intervene between the main camera 204 and the main chip 200 so that the electrical connection there between is direct. The switch 202 is provided at an electrical location between the sub camera 206 and the electrical path between the main camera 204 and the main chip 200. Depending on its position, the switch 202 separates or connects the main camera 204 and the sub camera 206. When the main camera 204 operates, the switch 202 is opened or turned off and separates a path of the sub camera 206 from a path of the main camera 206. When the sub camera 206 operates, the switch 202 is closed or turned on and connects the path of the sub camera 206 with the path of the main camera 206. Therefore, the switch 202 functions to address a potential malfunction (e.g., distortion, pixel error, etc.) caused by the load of the sub camera 206. In an exemplary embodiment, the switch 202 is implemented using a Field Effect Transistor (FET) or other similar solid state device.

The main camera 204 and the sub camera 206 comprise dual cameras on the portable terminal. The main camera 204 and the sub camera 206 function to photograph subjects and provide image data to the main chip for processing.

The main camera 204 and the sub camera 206 may each include a camera sensor for detecting and converting an optical signal sensed during image photographing into an electrical signal and a signal processor for converting an analog image signal produced by the camera sensor into digital data. The main camera 204 and the sub camera 206 operate and are separated and/or connected with each other depending on the operation of the switch 202.

Figure 3:
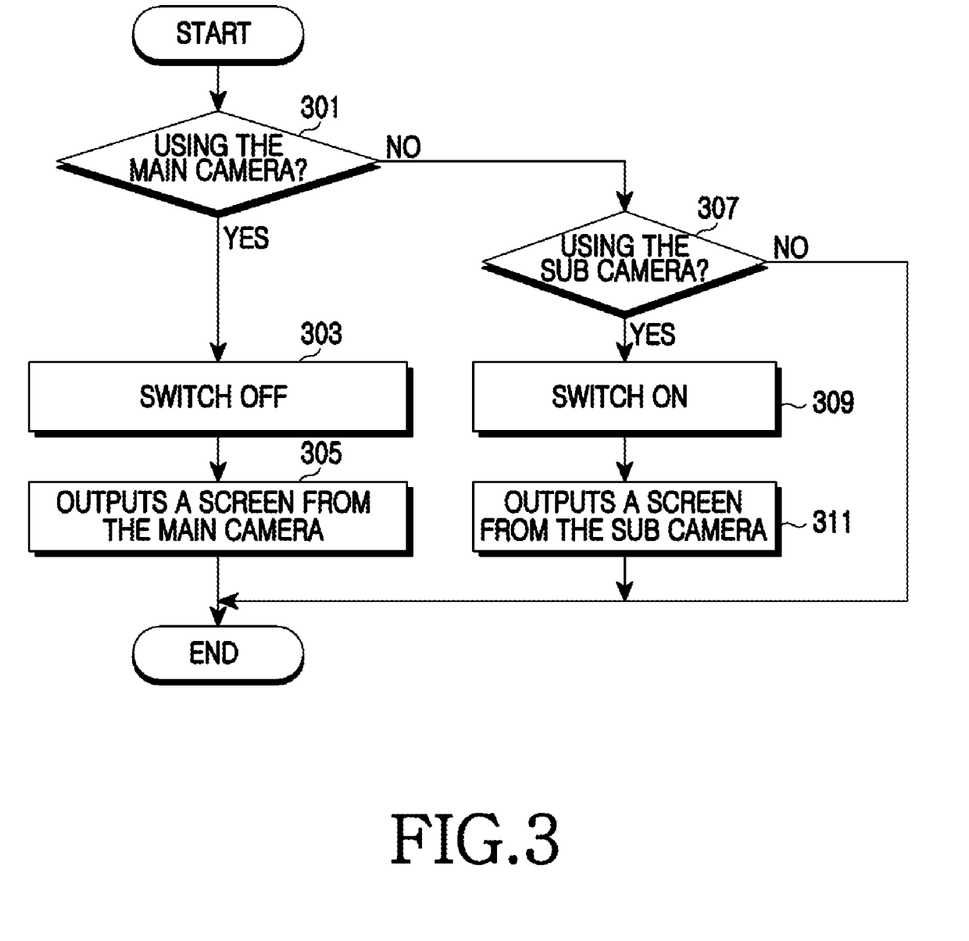
FIG. 3 is a flow diagram illustrating a process of separating a sub camera path from a main camera path in a portable terminal according to an exemplary embodiment of the present invention.

FIG. 3 is a flow diagram illustrating a process of separating a sub camera path from a main camera path in a portable terminal according to an exemplary embodiment of the present invention.

Referring to FIG. 3, the portable terminal determines if the main camera is used in step 301.

Figure 6A:
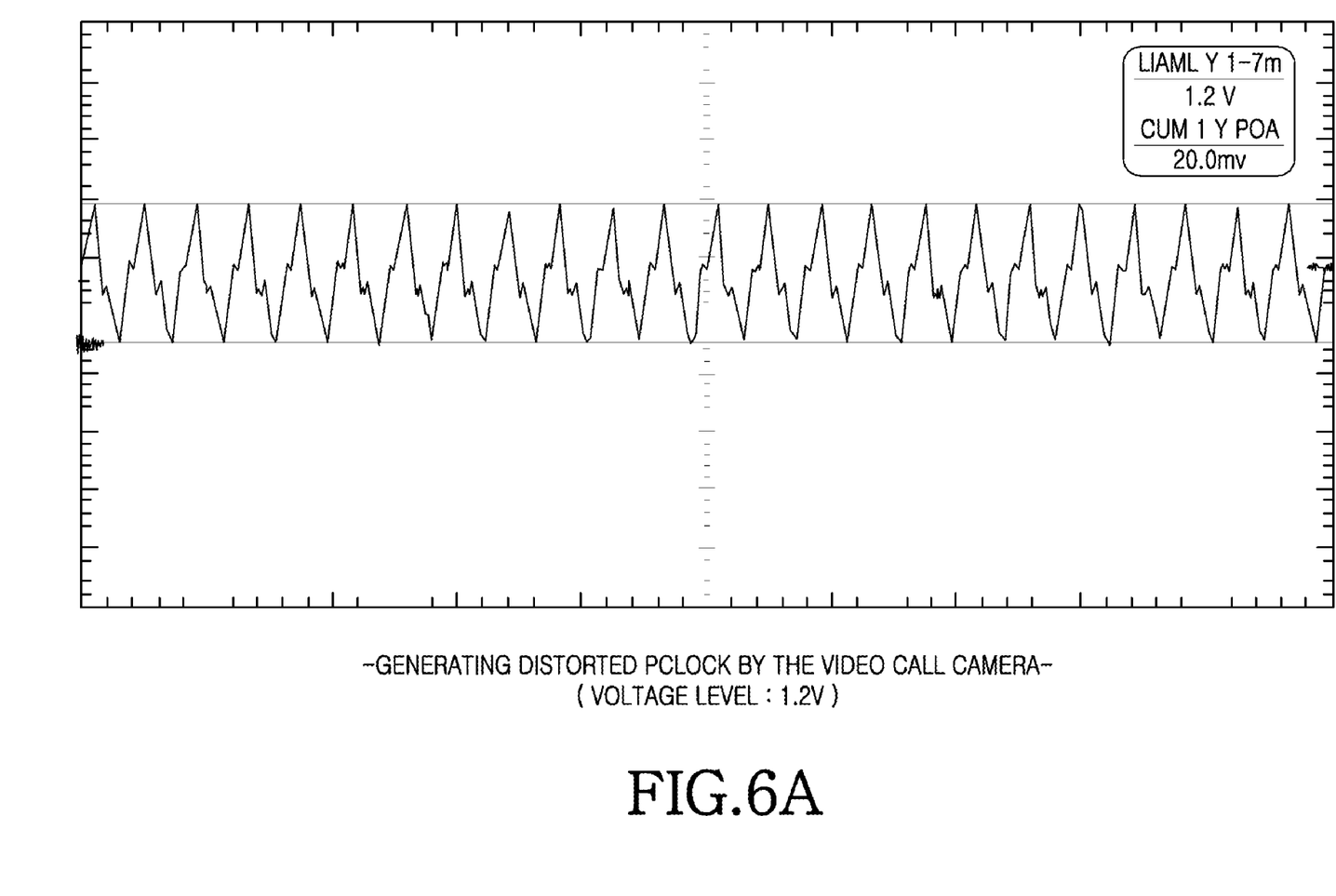
FIGS. 6A and 6B are diagrams illustrating a clock pulse before and after the separation of a sub camera path from a main camera path using a switch in a portable terminal according to the conventional art and an exemplary embodiment the present invention, respectively.
Figure 6B:
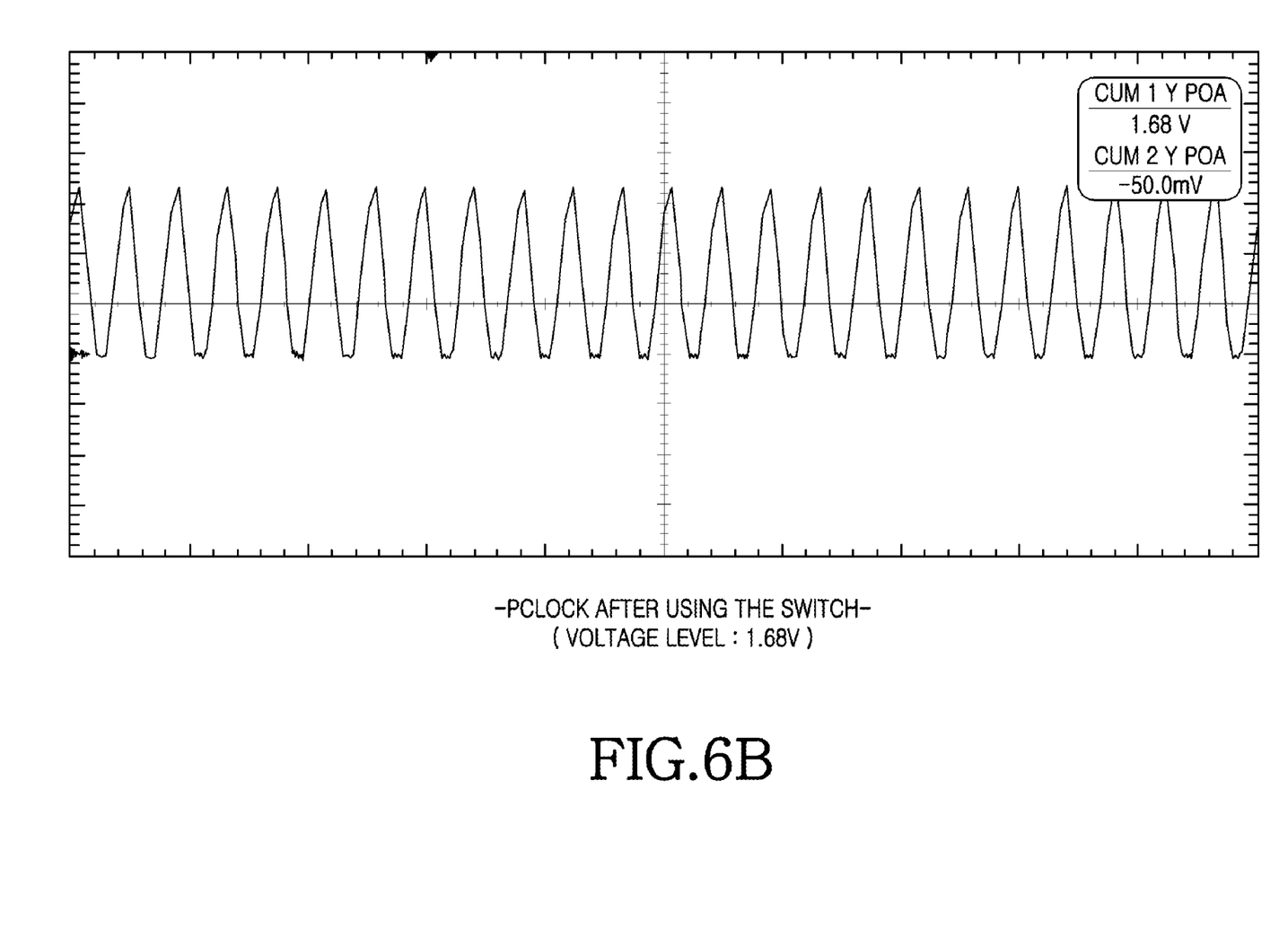

If it is determined that the main camera is used, the portable terminal turns off the switch in step 303, and the portable terminal outputs a screen from the main camera in step 305. That is, the portable terminal outputs, for example using a display, an image detected and processed by the main camera in step 305. More specifically, when the main camera operates and the switch is turned off, a path of the sub camera is separated from a path of the main camera for removal of the load of the sub camera. For example, when the main camera operates, the portable terminal separates the sub camera using the switch and obtains a stable clock waveform as illustrated in FIG. 6B instead of a distorted clock waveform caused by connection of the sub camera as illustrated in FIG. 6A. Then, the portable terminal terminates the process according to an exemplary embodiment of the present invention.

If it is determined in step 301 that the main camera is not used, the portable terminal determines if the sub camera is used in step 307. If the sub camera is used, the portable terminal turns on the switch in step 309 and outputs a screen from the sub camera in step 311. Then, the portable terminal terminates the process according to an exemplary embodiment of the present invention.

Figure 4:
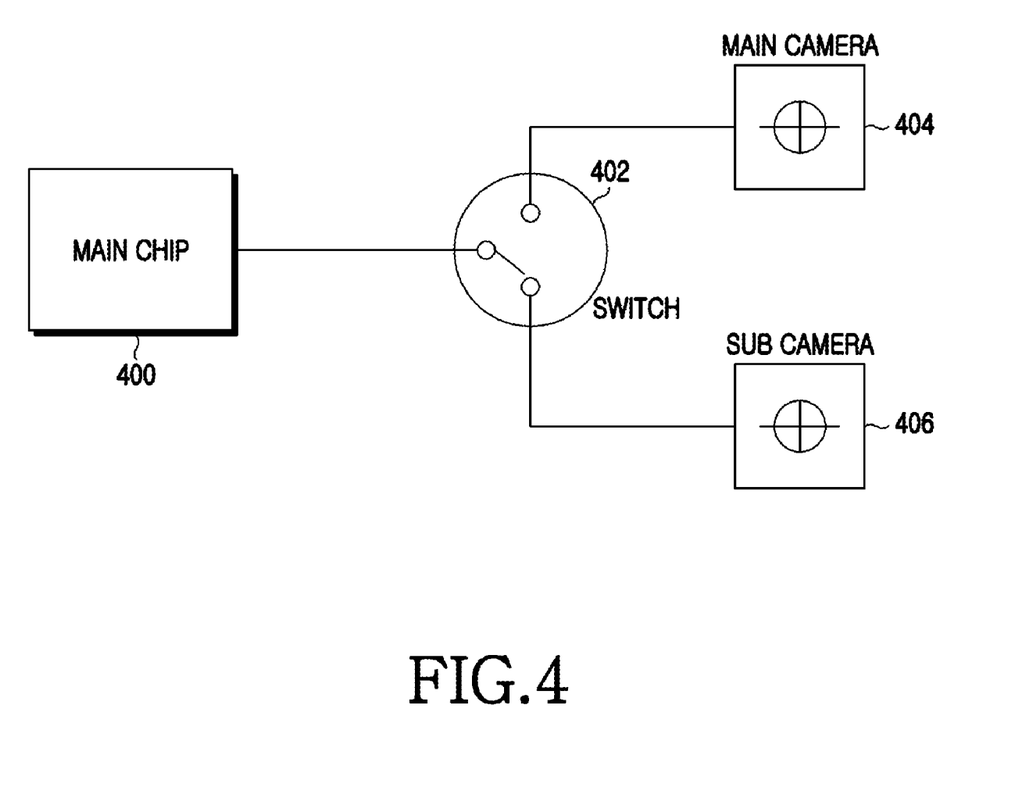
FIG. 4 is a block diagram illustrating a construction for separating a sub camera path from a main camera path in a portable terminal according to another exemplary embodiment of the present invention.

FIG. 4 is a block diagram illustrating a construction for separating a sub camera path from a main camera path in a portable terminal according to another exemplary embodiment of the present invention. Referring to FIG. 4, the portable terminal includes a main chip 400, a switch 402, a main camera 404, and a sub camera 406.

The main chip 400 provides a main clock using the sensor of the main camera 404 or the sub camera 406. And the main chip 400 receives a pixel clock from the main camera 404 or sub camera 406 currently being connected by the switch 402.

As illustrated in FIG. 4, the main camera 404 is indirectly connected to the main chip 400. That is, the switch 402 is located electrically between main camera 404 and main chip 400. Similarly, the sub camera 406 is also indirectly connected to the main chip 400 in that the switch 402 is electrically located between the sub camera 406 and the main chip 400. In operation, the switch 402 connects either the main camera 404 or the sub camera 406 to the main chip 400. When the main camera 404 operates, the switch 402 connects a path of the main camera 404 to the main chip 400 and when the sub camera 406 operates, the switch 402 connects a path of the sub camera 406 to the main chip 400. Therefore, the switch 402 functions to address a potential malfunction (e.g., distortion, pixel error, etc.) caused by the load of the sub camera 406. In an exemplary embodiment, the switch 402 is implemented using a Field Effect Transistor (FET) or other similar solid state device.

The main camera 404 and the sub camera 406 comprise dual cameras on the portable terminal. The main camera 404 and the sub camera 406 function to photograph subjects and provide image data to the main chip 400 for processing.

The main camera 404 and the sub camera 406 may each include a camera sensor for detecting and converting an optical signal sensed during image photographing into an electrical signal and a signal processor for converting an analog image signal produced by the camera sensor into digital data. The main camera 404 and the sub camera 406 operate and are connected with the main chip 400 depending on the operation of the switch 402.

Figure 5:
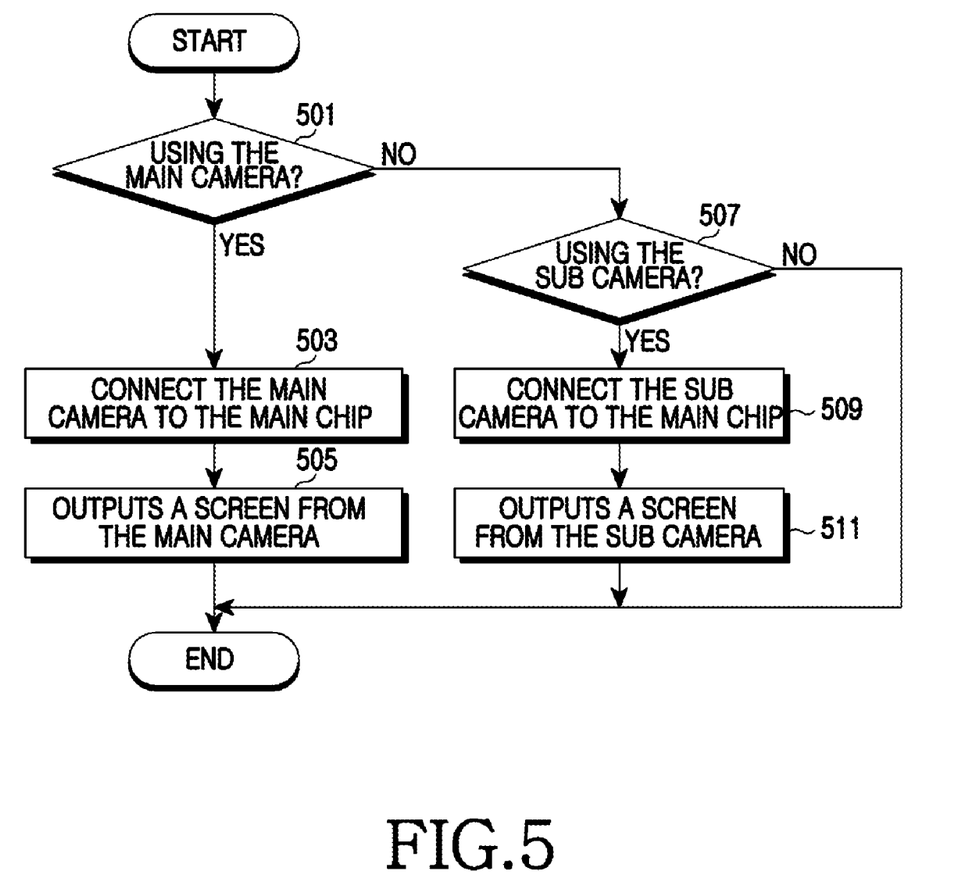
FIG. 5 is a flow diagram illustrating a process of separating a sub camera path from a main camera path in a portable terminal according to another exemplary embodiment of the present invention.

FIG. 5 is a flow diagram illustrating a process of separating a sub camera path from a main camera path in a portable terminal according to an exemplary embodiment of the present invention.

Referring to FIG. 5, the portable terminal determines if the main camera is used in step 501.

If it is determined that the main camera is used, the portable terminal connects the main camera to the main chip and separates the sub camera from the main chip using a switch in step 503, and the portable terminal outputs a screen from the main camera in step 505. When the main camera operates, the switch connects only the main camera to the main chip. For example, when the main camera operates, the portable terminal separates the sub camera using the switch and obtains a stable clock waveform as illustrated in FIG. 6B instead of a distorted clock waveform caused by connection of the sub camera as illustrated in FIG. 6A. Then, the portable terminal terminates the process according to an exemplary embodiment of the present invention.

If it is determined in step 501 that the main camera is not used, the portable terminal determines if the sub camera is used in step 507. If the sub camera is used, the portable terminal connects the sub camera to the main chip and separates the main camera from the main chip using the switch in step 509, and the portable terminal outputs a screen from the sub camera in step 511. Then, the portable terminal terminates the process according to an exemplary embodiment of the present invention.

FIGS. 6A and 6B are diagrams illustrating a clock pulse before and after the separation of a sub camera path from a main camera path using a switch in a portable terminal according to the conventional art and an exemplary embodiment the present invention, respectively.

Referring to FIGS. 6A and 6B, when the main camera operates, the portable terminal separates the path of the sub camera from the path of the main camera using the switch and obtains a stable clock waveform as illustrated in FIG. 6B rather than a distorted clock waveform caused by connection of the sub camera as illustrated in FIG. 6A.

Figure 7A:
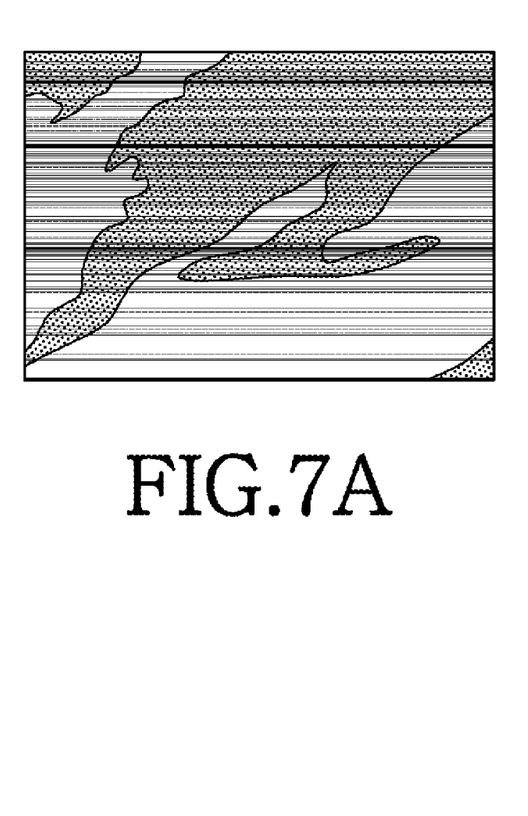
FIGS. 7A and 7B are diagrams illustrating output screens of a portable terminal according to an exemplary embodiment the present invention.
Figure 7B:
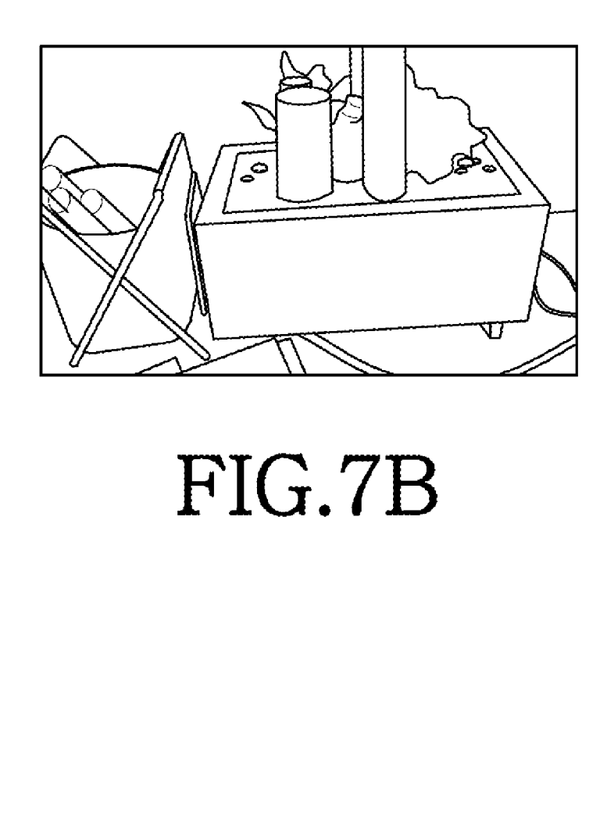

FIGS. 7A and 7B are diagrams illustrating output screens of a portable terminal according to an exemplary embodiment the present invention.

Referring to FIG. 7A, a distorted image is output by the portable terminal when the sub camera is connected to the path of the main camera. The distorted image is caused by the distorted clock waveform due to connection of the sub camera to the path of the main camera. As illustrated in FIG. 7B, when the sub camera is disconnected from the path of the main camera, the image is substantially free of distortion because the clock waveform is stable.

As described above, exemplary embodiments of the present invention allow for separation and connection of the main camera and the sub camera by using a switching circuit board in a portable terminal. Accordingly, it is possible to remove the parasitic element as a load on the main camera and secure a stable performance.

While the invention has been shown and described with reference to exemplary embodiments thereof, it will be understood by those skilled in the art that various changes in form and details may be made therein without departing from the spirit and scope of the invention as defined by the appended claims and their equivalents.

What is claimed is:

1. An apparatus for separating a sub camera signal path and a main camera signal path in a portable terminal, the apparatus comprising:
    a main camera for receiving a main clock signal from a main chip and for transmitting a main camera pixel clock signal to the main chip in response to the main clock signal;
    a sub camera for receiving the main clock signal from the main chip and for transmitting a sub camera pixel clock signal to the main chip in response to the main clock signal; and a switch for switching to separate the sub camera from a path of the main chip when the main camera operates.

2. The apparatus of claim 1, wherein the main chip is electrically connected directly to the main camera through a first path.

3. The apparatus of claim 2, wherein the switch is provided between the first path and the sub camera.

4. The apparatus of claim 3, wherein, when the switch operates in a first position, the sub camera is connected to the first path such that the main camera and sub camera are electrically connected to the main chip and, when the switch operates in a second position, the sub camera is isolated from the first path.

5. The apparatus of claim 1, wherein the sub camera comprises a video call camera.

6. The apparatus of claim 1, wherein the main camera is indirectly connected to the main chip by a first path and the sub camera is indirectly connected to the main chip by a second path.

7. The apparatus of claim 6, wherein the switch is electrically provided between the main camera and the main chip and between the sub camera and the main chip.

8. The apparatus of claim 7, wherein, when the switch is operated in a first position, the main camera is electrically connected to the main chip and the sub camera is electrically isolated from the main chip and, when the switch is operated in a second position, the main camera is electrically isolated from the main chip and the sub camera is electrically connected to the main chip.

9. The apparatus of claim 8, wherein, in both the first and second positions of the switch, the main camera and the sub camera are electrically isolated from each other.

10. A method for separating a main camera signal path and a sub camera signal path in a portable terminal, the method comprising:
  determining if a main camera is selected;
  if the main camera is selected, isolating a path from a main chip to a sub camera when the main camera operates;
  if the main camera is not selected, determining if the sub camera is selected; and
  if the sub camera is selected, establishing a path from the main chip to the sub camera.

11. The method of claim 10, wherein the isolating of the path from the main chip to the sub camera comprises opening a switch between the sub camera and a path from the main chip to the main camera.

12. The method of claim 11, wherein the establishing of the path from the main chip to the sub camera comprises closing the switch between the sub camera and the path from the main chip to the main camera.

13. The method of claim 10, wherein the sub camera comprises a video call camera.

14. The method of claim 10, wherein the isolating of the path from the main chip to the sub camera comprises placing a switch in a first position to connect the main camera to the main chip wherein, in the first switch position, the sub camera is isolated from the main chip.

15. The method of claim 14, wherein the establishing of the path from the main chip to the sub camera comprises placing the switch in a second position to connect the sub camera to the main switch wherein, in the second switch position, the main camera is isolated from the main chip.

* * * * *